(No Model.)

S. SCHAYER.
CONFECTIONERY.

No. 320,003. Patented June 16, 1885.

Witnesses:
Wm Gardner
Geo. H. Evans

Inventor:
Simon Schayer
By his Attorney
Geo. W. Miatt

UNITED STATES PATENT OFFICE.

SIMON SCHAYER, OF NEW YORK, N. Y.

CONFECTIONERY.

SPECIFICATION forming part of Letters Patent No. 320,003, dated June 16, 1885.

Application filed February 13, 1885. (No model.)

*To all whom it may concern:*

Be it known that I, SIMON SCHAYER, a citizen of the United States, residing in the city, county, and State of New York, have invented a certain new and useful Article of Manufacture in Confectionery, of which the following is a specification, reference being had to the accompanying drawings, forming part thereof, in which—

Figure 1:
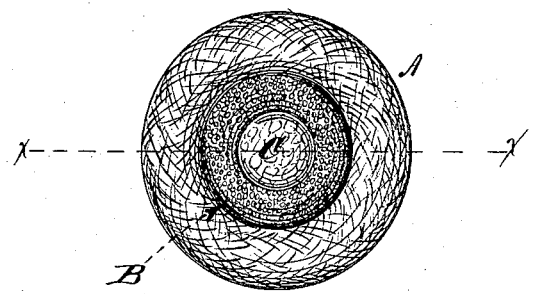
Figure 2:
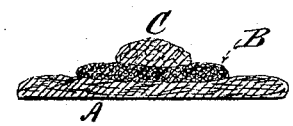

Figure 1 is a top view of my improved confection; and Fig. 2 a transverse section of the same upon plane of line x x, Fig. 1.

My invention relates more particularly to that class of confections known as "macaroons," which consist, usually, of a preparation of almonds or cocoanuts united with sugar and whites of eggs, and baked in the form of a cake.

My improvement consists in combining and arranging with such macaroons a filling or layer of fig preserve or paste, which in turn is provided with a filling of peanut or other nut candy or paste, the whole united and baked together to form a single cake, substantially as hereinafter set forth. A most delicious and attractive article of food is thus produced, in which the different flavors of the ingredients are blended and combined, while the body of the cake is rendered soft, but tenacious and gummous, thus agreeably protracting the degree of mastication essential to its consumption.

In order to enable others skilled in the art to make and use my improved articles of food, which I intend to designate as "fig-blossoms," I herewith set forth the process of manufacture, it being understood that I do not limit myself to the exact method or proportions named, it being obvious that varieties may be resorted to which will not materially affect the result.

I first prepare the base A of the new macaroon of a compound in about the proportion of one cocoanut (or an equivalent quantity of almonds or other suitable nuts) to one pound of sugar, united with the whites of three eggs. The sugar and prepared nut are placed upon a steam-table and boiled for about fifteen minutes until reduced to a proper consistency, and then poured upon a cooling-slab. After cooling sufficiently, the proper proportion of whites of eggs is added and the whole agitated in a mixer for a suitable length of time, when it is dropped in proper quantities upon the surface of the usual bake-tins. The fig-paste B, which may consist of figs and sugar in about equal proportions, is rolled and cut out into the desired shape and laid or fitted upon the top of the base A. The center-piece or top C is preferably made from a compound of peanuts with sugar and the whites of eggs, although any other kind of nut may be substituted, if preferred. The proportions in this center-filling C are about one pound of nut to two pounds of sugar, with the whites of eggs sufficient to form the whole into a thin paste. Suitable portions, C, of this paste are next placed upon the fig-filling B, and the whole baked together in the usual manner.

In the drawings, all the parts A B C are shown as circular in form, although it is obvious that any desired configuration can be imparted to either or all three parts, and a variety of attractive designs thus produced without departing from the scope of my invention.

If preferred, the fig-filling may be placed upon the top of the nut-filling; but the better arrangement is that herein shown, in which the comparatively soft fig-filling is interposed between and acts to unite the two nut compounds.

What I claim as my invention, and desire to secure by Letters Patent, is—

As an article of manufacture, a confection consisting of a layer of fig-paste interposed between and uniting two layers of nut-paste, substantially in the manner and for the purpose described.

SIMON SCHAYER.

Witnesses:
J. F. REINHARD,
WM. GARDNER.